United States Patent
Wang et al.

(10) Patent No.: US 12,418,498 B2
(45) Date of Patent: *Sep. 16, 2025

(54) TECHNOLOGIES FOR DYNAMIC BATCH SIZE MANAGEMENT

(71) Applicant: Intel Corporation, Santa Clara, CA (US)

(72) Inventors: Ren Wang, Portland, OR (US); Mia Primorac, Hillsboro, OR (US); Tsung-Yuan C. Tai, Portland, OR (US); Saikrishna Edupuganti, Hillsboro, OR (US); John J. Browne, Limerick (IE)

(73) Assignee: Intel Corporation, Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/228,420

(22) Filed: Jul. 31, 2023

(65) Prior Publication Data

US 2023/0379271 A1 Nov. 23, 2023

Related U.S. Application Data

(63) Continuation of application No. 17/838,872, filed on Jun. 13, 2022, now Pat. No. 11,757,802, which is a
(Continued)

(51) Int. Cl.
*H04L 49/90* (2022.01)
*H04L 47/36* (2022.01)
*H04L 49/9005* (2022.01)

(52) U.S. Cl.
CPC ........ *H04L 49/9068* (2013.01); *H04L 47/365* (2013.01); *H04L 49/9005* (2013.01)

(58) Field of Classification Search
CPC ............... H04L 49/9068; H04L 47/365; H04L 49/9005
See application file for complete search history.

(56) References Cited

U.S. PATENT DOCUMENTS 11,362,968 B2 * 6/2022 Wang ................... H04L 49/9068
11,757,802 B2 * 9/2023 Wang ................... H04L 47/365
370/412
(Continued)

OTHER PUBLICATIONS

Intel Data Plane Development Kit (Intel DPDK) Overview Packet Processing on Intel Architecture, Dec. 2012, 35 pages.
(Continued)

*Primary Examiner* — Benjamin H Elliott, IV
(74) *Attorney, Agent, or Firm* — Essential Patents Group, LLP; Christopher K. Gagne

(57) ABSTRACT

Technologies for dynamically managing a batch size of packets include a network device. The network device is to receive, into a queue, packets from a remote node to be processed by the network device, determine a throughput provided by the network device while the packets are processed, determine whether the determined throughput satisfies a predefined condition, and adjust a batch size of packets in response to a determination that the determined throughput satisfies a predefined condition. The batch size is indicative of a threshold number of queued packets required to be present in the queue before the queued packets in the queue can be processed by the network device.

24 Claims, 6 Drawing Sheets

Related U.S. Application Data continuation of application No. 15/640,258, filed on Jun. 30, 2017, now Pat. No. 11,362,968.

(56) References Cited

U.S. PATENT DOCUMENTS

| | | | | |
|---|---|---|---|---|
| 2003/0091031 | A1* | 5/2003 | Kuhlmann | H04L 12/1485 370/352 |
| 2010/0115059 | A1* | 5/2010 | Youill | H04L 67/10 709/219 |
| 2011/0154073 | A1* | 6/2011 | Wang | G06F 9/505 709/224 |
| 2011/0255403 | A1* | 10/2011 | Papirakis | H04L 47/283 370/230.1 |
| 2011/0288837 | A1* | 11/2011 | Blevins | G05B 17/02 703/6 |
| 2012/0250571 | A1* | 10/2012 | Andrews | H04L 47/627 370/252 |
| 2013/0243009 | A1* | 9/2013 | Andrews | H04L 49/00 370/429 |
| 2013/0254771 | A1* | 9/2013 | Musayev | G06F 9/4843 718/101 |
| 2014/0250073 | A1* | 9/2014 | Zalpuri | G06F 16/951 707/636 |
| 2014/0289456 | A1* | 9/2014 | Simha | G06F 11/141 711/103 |
| 2015/0127863 | A1* | 5/2015 | Sokol, Jr. | G06F 13/37 710/111 |
| 2015/0227576 | A1* | 8/2015 | Plate | G06Q 30/04 707/690 |
| 2015/0372949 | A1* | 12/2015 | Eardley | H04L 49/90 370/229 |
| 2016/0246695 | A1* | 8/2016 | Heikinheimo | G06F 11/261 |
| 2016/0266816 | A1* | 9/2016 | Alapati | G06F 3/0631 |
| 2016/0364299 | A1* | 12/2016 | Pidduck | G06F 16/93 |
| 2017/0019302 | A1* | 1/2017 | Lapiotis | H04L 41/0813 |
| 2017/0099231 | A1* | 4/2017 | Li | H04L 43/0888 |
| 2018/0069793 | A1* | 3/2018 | Narayanan | H04L 47/783 |
| 2018/0131463 | A1* | 5/2018 | Martin Carrascosa | H04L 1/0002 |
| 2018/0293463 | A1* | 10/2018 | Brown | G06F 9/4881 |
| 2018/0302328 | A1* | 10/2018 | Keith | H04L 43/026 |
| 2018/0316609 | A1* | 11/2018 | Li | H04L 47/2483 |
| 2019/0007349 | A1* | 1/2019 | Wang | H04L 47/365 |
| 2023/0030060 | A1* | 2/2023 | Wang | H04L 49/9068 |
| 2023/0379271 | A1* | 11/2023 | Wang | H04L 49/9068 |

OTHER PUBLICATIONS

Notice of Allowance for U.S. Appl. No. 15/640,258, dated Feb. 16, 2022.

Notice of Allowance for U.S. Appl. No. 15/640,258, dated Nov. 4, 2020.

Notice of Allowance from U.S. Appl. No. 17/838,872 notified May 10, 2023, 5 pgs.

Office Action for U.S. Appl. No. 15/640,258, dated Jul. 14, 2020.

Office Action for U.S. Appl. No. 15/640,258, dated Mar. 12, 2021.

Office Action for U.S. Appl. No. 15/640,258, dated Oct. 18, 2021.

Verizon Network infrastructure Planning, "SDN-NFV Reference Architecture" Version 1.0, Feb. 2016, 220 pages.

"Lagopus switch", downloaded from http://www.lagopus.org/ on Dec. 26, 2017, 3 pages.

"VPP? What is VPP?", downloaded from https://wiki.fd.io/view/VPP/What_is_VPP%3F on Dec. 26, 2017, 8 pages.

"What is Open Switch (OVS)?", downloaded from http://www.sdxcentral.com/cloud/open-source/definitions/what-is-open-switch/ on Dec. 26, 2017, 3 pages.

Baker, Fred, et al., "IETF Recommendations Regarding, Active Queue Management", Internet Engineering Task Force (IETF), ISSN: 2070-1721, Jul. 2015, 32 pages.

Miao, et al., "Smart Batching: a Load-sensitive Self-tuning Packet I/O Using Dynamic Batch Sizing", 2016 IEEE 18th International Conference on High Performance Computing and Communications; IEEE 14th International Conference on Smart City; IEEE 2nd International Conference on Data Science and Systems (Year: 2016).

Srisankar Kunniyur, et al., "Analysis and Design of an Adaptive Virtual Queue (AVQ) Algorithm for Active Queue Management", SIGCOMM '01, Aug. 2001, 12 pages.

Su, Zidong, et al., "Towards including batch services in models for DPDK-based virtual switches", 2017 Global Information Infrastructure and Networking Symposium (GIIS), 8 pgs.

Tseng, Janet, et al., "Exploiting Integrated GPUs for Network Packet Processing Workloads", 2016 IEEE NetSoft Conference and Workshops (NetSoft), 5 pgs.

Wikipedia, "CoDel", 2012, 5 pages, retrieved from internet: https://en.wikipedia.org/wiki/coDel.

Zhou, D., et al., "Scalable, High Performance Ethernet Forwarding with CuckooSwitch", CoNeXT'13, 9th International Conference on Emerging Networking Experiments and Technologies, Dec. 9-12, 2013, 12 pages, CM, Santa Barbara, CA, USA.

* cited by examiner

TECHNOLOGIES FOR DYNAMIC BATCH SIZE MANAGEMENT

CLAIM OF PRIORITY

This application is a continuation of prior U.S. patent application Ser. No. 17/838,872, filed Jun. 13, 2022 and titled "TECHNOLOGIES FOR DYNAMIC BATCH SIZE MANAGEMENT," which is a continuation of prior U.S. patent application Ser. No. 15/640,258, filed Jun. 30, 2017 and titled "TECHNOLOGIES FOR DYNAMIC BATCH SIZE MANAGEMENT" (now U.S. Pat. No. 11,362,968). Each of the aforesaid prior Patent Applications is hereby incorporated herein by reference in its entirety.

BACKGROUND

In recent years, ensuring high performance for software packet processing on computer architecture became paramount due to the fast development of network functions virtualization (NFV)/software-defined networking (SDN) and many new usage models such as telecommunication and Internet of Things (IoT) usages. Many efforts have been made to optimize throughput performance. Another important aspect of packet processing is latency or jitter, which may affect response time.

To optimize throughput performance, packets in a queue are processed in a batched fashion. Typically, an increase in a batch size of packets increases throughput performance. However, the increase in the batch size may negatively affect the latency and jitter performance by forcing packets to wait in the queue while gathering enough packets to form a batch of the predefined batch size. The negative impact may amplify when there are multiple processing stages. On the other hand, decreasing the batch size may decrease the latency performance but may negatively affect the throughput performance.

BRIEF DESCRIPTION OF THE DRAWINGS

The concepts described herein are illustrated by way of example and not by way of limitation in the accompanying figures. For simplicity and clarity of illustration, elements illustrated in the figures are not necessarily drawn to scale. Where considered appropriate, reference labels have been repeated among the figures to indicate corresponding or analogous elements.

DETAILED DESCRIPTION OF THE DRAWINGS

Figure 1:
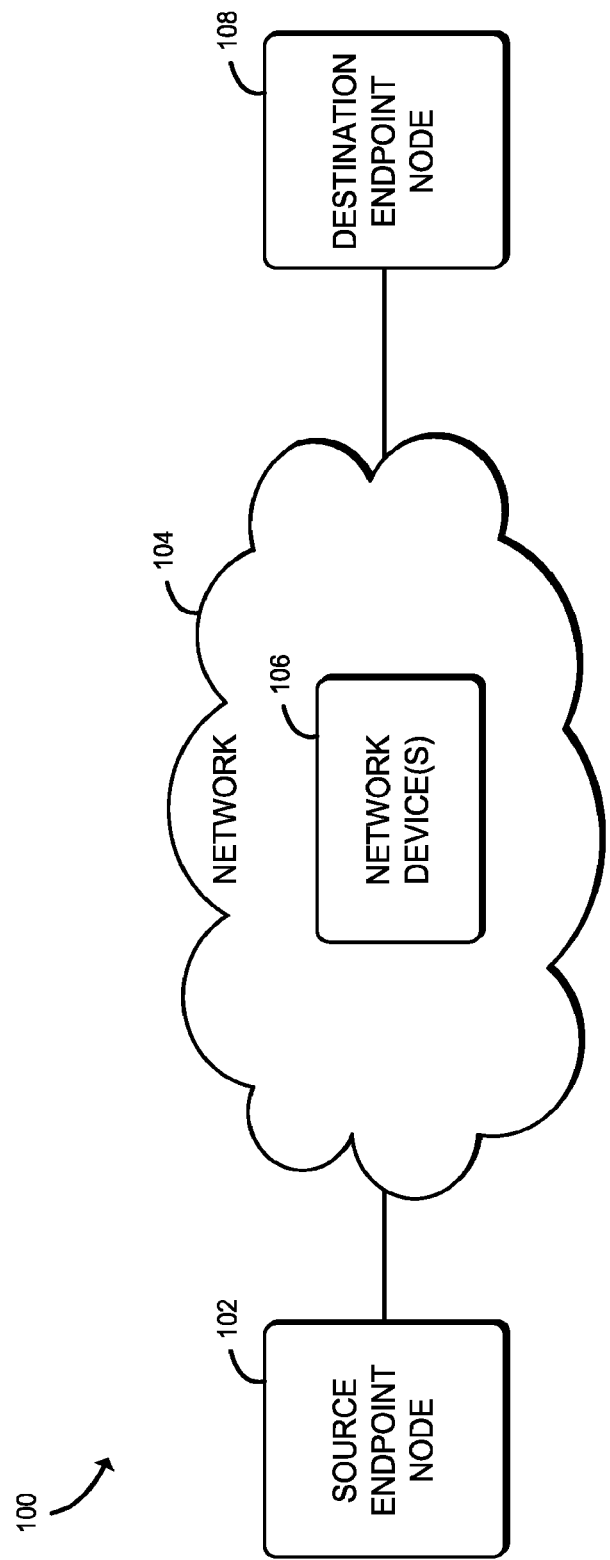
FIG. 1 is a simplified block diagram of at least one embodiment of a system that includes a network device for dynamic batch size management.

While the concepts of the present disclosure are susceptible to various modifications and alternative forms, specific embodiments thereof have been shown by way of example in the drawings and will be described herein in detail. It should be understood, however, that there is no intent to limit the concepts of the present disclosure to the particular forms disclosed, but on the contrary, the intention is to cover all modifications, equivalents, and alternatives consistent with the present disclosure and the appended claims.

References in the specification to "one embodiment," "an embodiment," "an illustrative embodiment," etc., indicate that the embodiment described may include a particular feature, structure, or characteristic, but every embodiment may or may not necessarily include that particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described. Additionally, it should be appreciated that items included in a list in the form of "at least one of A, B, and C" can mean (A); (B); (C); (A and B); (A and C); (B and C); or (A, B, and C). Similarly, items listed in the form of "at least one of A, B, or C" can mean (A); (B); (C); (A and B); (A and C); (B and C); or (A, B, and C).

The disclosed embodiments may be implemented, in some cases, in hardware, firmware, software, or any combination thereof. The disclosed embodiments may also be implemented as instructions carried by or stored on one or more transitory or non-transitory machine-readable (e.g., computer-readable) storage media, which may be read and executed by one or more processors. A machine-readable storage medium may be embodied as any storage device, mechanism, or other physical structure for storing or transmitting information in a form readable by a machine (e.g., a volatile or non-volatile memory, a media disc, or other media device).

In the drawings, some structural or method features may be shown in specific arrangements and/or orderings. However, it should be appreciated that such specific arrangements and/or orderings may not be required. Rather, in some embodiments, such features may be arranged in a different manner and/or order than shown in the illustrative figures. Additionally, the inclusion of a structural or method feature in a particular figure is not meant to imply that such feature is required in all embodiments and, in some embodiments, may not be included or may be combined with other features.

Referring now to FIG. 1, in an illustrative embodiment, a system 100 for dynamically adjusting a batch size of packets to achieve an optimal combination of packet latency and throughput includes a source endpoint node 102 and a destination endpoint node 108 in communication over a network 104 via one or more network devices 106. In use, as described in more detail below, the network device 106 dynamically adjusts the batch size (e.g., a threshold number of packets to be present in a queue before being processed by the network device 106) to minimize packet latency while achieving a maximum throughput performance between the source endpoint node 102 and the destination endpoint node 108 over the network 104. To do so, the network device 106 continuously or periodically monitors and adjusts the batch size of packets to achieve an optimal batching configuration by balancing the throughput performance and the latency performance. The large batch size of packets may maximize the throughput performance but may negatively affect the latency and jitter performance, while a relatively small batch size of packets may improve the latency performance (e.g., reduce latency) but may negatively affect the throughput performance (e.g., reduce throughput).

Figure 5:
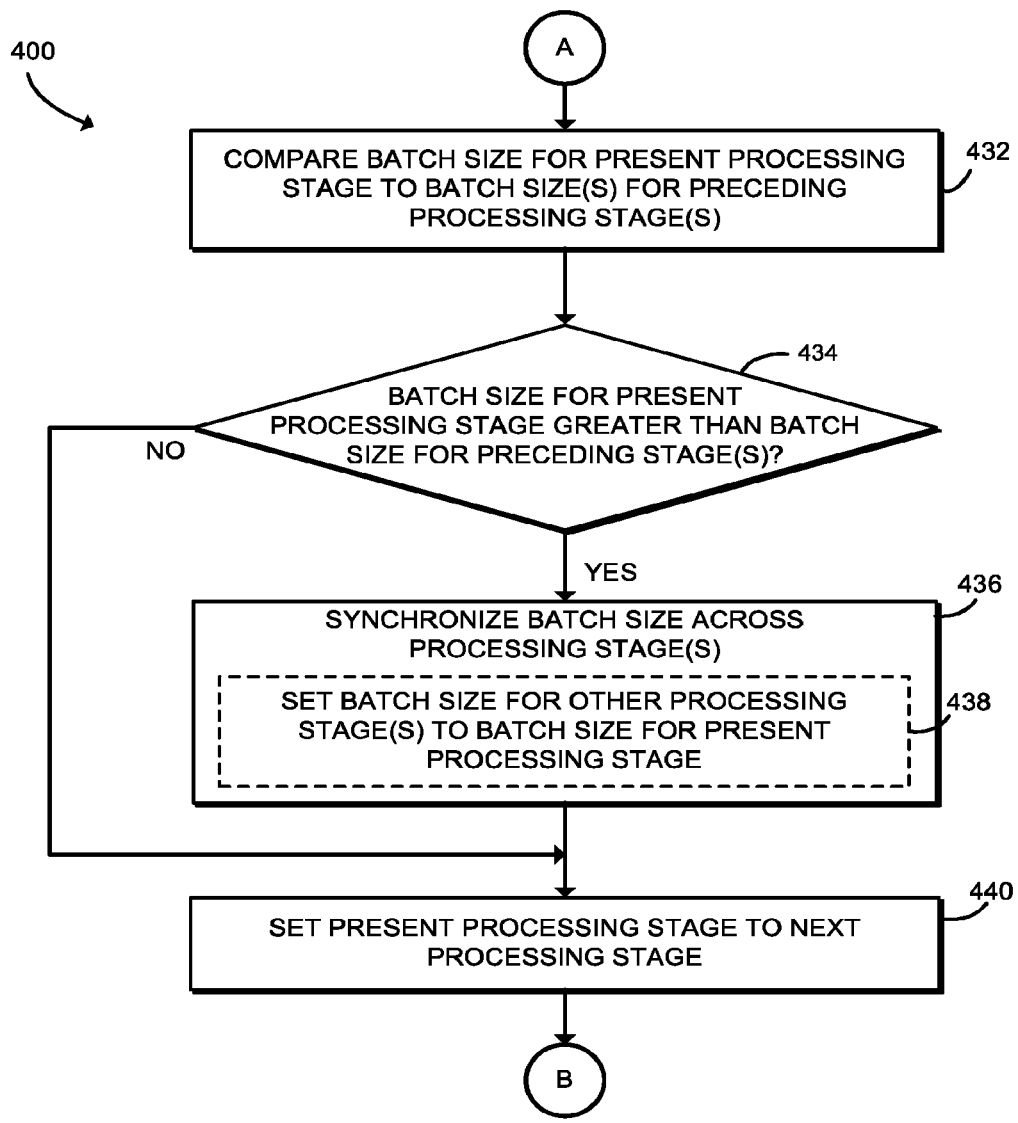

In operation, a network device (e.g., the network device 106) may process packets in a single processing stage or in multiple processing stages. Each processing stage, in the illustrative embodiment, has its own queue, batch size of packets, and throughput. In the illustrative embodiment, the network device 106 dynamically adjusts the batch size for each processing stage based on a throughput performance of the corresponding processing stage and a queue condition for the corresponding processing stage (e.g., a number of packets in the queue and an increasing or decreasing rate of change in packets in the queue). For example, the network device 106 may increase the batch size of packets to increase the throughput performance for the processing stage until the throughput performance no longer increases, indicating that further increasing the batch size will only negatively affect the latency without increasing the throughput. Additionally, the network device 106 may further synchronize the batch size across the multiple processing stages in the same processing pipeline as discussed in detail in FIG. 5.

The source endpoint node 102 may be embodied as any type of computation or computing device capable of performing the functions described herein, including, without limitation, a computer, a desktop computer, a smartphone, a workstation, a laptop computer, a notebook computer, a tablet computer, a mobile computing device, a wearable computing device, a network appliance, a web appliance, a distributed computing system, a processor-based system, and/or a consumer electronic device. Similarly, the destination endpoint node 108 may be embodied as any type of computation or computing device capable of performing the functions described herein, including, without limitation, a computer, a desktop computer, a smartphone, a workstation, a laptop computer, a notebook computer, a tablet computer, a mobile computing device, a wearable computing device, a network appliance, a web appliance, a distributed computing system, a processor-based system, and/or a consumer electronic device. Each of the source endpoint node 102 and the destination endpoint node 108 may include components commonly found in a computing device such as a processor, memory, input/output subsystem, data storage, communication circuitry, etc.

The network 104 may be embodied as any type of wired or wireless communication network, including cellular networks (e.g., Global System for Mobile Communications (GSM), 3G, Long Term Evolution (LTE), Worldwide Interoperability for Microwave Access (WiMAX), etc.), digital subscriber line (DSL) networks, cable networks (e.g., coaxial networks, fiber networks, etc.), telephony networks, local area networks (LANs) or wide area networks (WANs), global networks (e.g., the Internet), or any combination thereof. Additionally, the network 104 may include any number of network devices 106 as needed to facilitate communication between the source endpoint node 102 and the destination endpoint node 108.

Each network device 106 may be embodied as any type of computing device capable of facilitating wired and/or wireless network communications between the source endpoint node 102 and the destination endpoint node 108. For example, each network device 106 may be embodied as a server (e.g., stand-alone, rack-mounted, blade, etc.), a router, a switch, a network hub, an access point, a storage device, a compute device, a multiprocessor system, a network appliance (e.g., physical or virtual), a computer, a desktop computer, a smartphone, a workstation, a laptop computer, a notebook computer, a tablet computer, a mobile computing device, or any other computing device capable of processing network packets.

Figure 2:
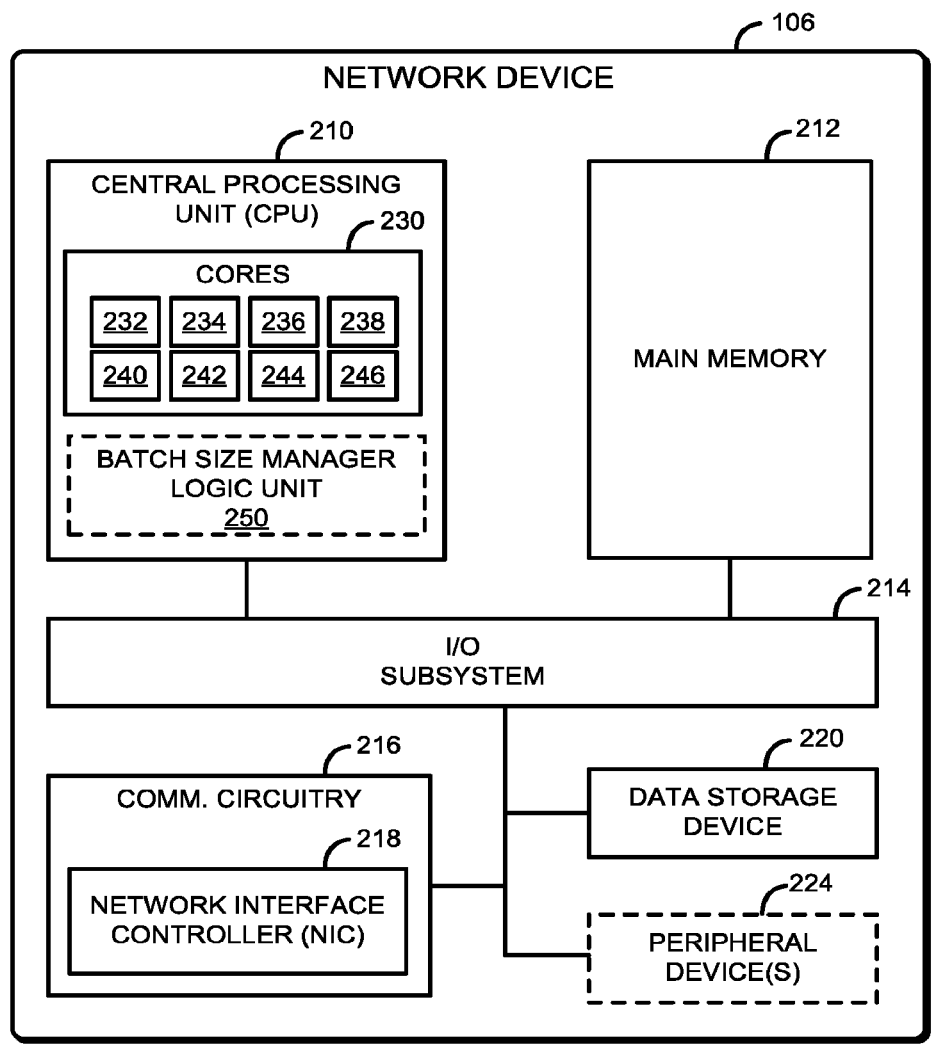
FIG. 2 is a simplified block diagram of at least one embodiment of a network device of the system of FIG. 1.

As shown in FIG. 2, an illustrative network device 106 includes a central processing unit (CPU) 210, a main memory 212, an input/output (I/O) subsystem 214, communication circuitry 216, and a data storage device 220. Of course, in other embodiments, the network device 106 may include other or additional components, such as those commonly found in a computer (e.g., data storage, display, etc.). Additionally, in some embodiments, one or more of the illustrative components may be incorporated in, or otherwise form a portion of, another component. For example, in some embodiments, the main memory 212, or portions thereof, may be incorporated in the CPU 210.

The CPU 210 may be embodied as any type of processor capable of performing the functions described herein. The CPU 210 may be embodied as a single or multi-core processor(s), a microcontroller, or other processor or processing/controlling circuit. In some embodiments, the CPU 210 may be embodied as, include, or be coupled to a field programmable gate array (FPGA), an application specific integrated circuit (ASIC), a graphics processing unit (GPU), reconfigurable hardware or hardware circuitry, or other specialized hardware to facilitate performance of the functions described herein. In the illustrative embodiment, the CPU 210 is embodied as a processor containing a set 230 of multiple cores 232, 234, 236, 238, 240, 242, 244, and 246. While eight cores are shown in FIG. 2, it should be understood that in other embodiments, the CPU 210 may contain a different number of cores. Similarly, the main memory 212 may be embodied as any type of volatile (e.g., dynamic random access memory (DRAM), etc.) or non-volatile memory or data storage capable of performing the functions described herein. In some embodiments, all or a portion of the main memory 212 may be integrated into the CPU 210. In operation, the main memory 212 may store various data and software used during operation of the network device 106 such as packet data, operating systems, applications, programs, libraries, and drivers.

In addition, in some embodiments, the CPU 210 may also include a batch size manager logic unit 250. The batch size manager logic unit 250 may be embodied as any hardware device (e.g., a co-processor, an FPGA, and ASIC, or circuitry) capable of performing functions that include dynamic batch size adjustment in a queue environment for each processing stage. More specifically, the batch size manager logic unit 250 is any device capable of performing the batch size adjustment described with respect to FIGS. 4-6 below. In some embodiments, the batch size manager logic unit 250 may be virtualized.

The I/O subsystem 214 may be embodied as circuitry and/or components to facilitate input/output operations with the CPU 210, the main memory 212, and other components of the network device 106. For example, the I/O subsystem 214 may be embodied as, or otherwise include, memory controller hubs, input/output control hubs, integrated sensor hubs, firmware devices, communication links (i.e., point-to-point links, bus links, wires, cables, light guides, printed circuit board traces, etc.), and/or other components and subsystems to facilitate the input/output operations. In some embodiments, the I/O subsystem 214 may form a portion of a system-on-a-chip (SoC) and be incorporated, along with one or more of the CPU 210, the main memory 212, and other components of the network device 106, on a single integrated circuit chip.

The communication circuitry 216 may be embodied as any communication circuit, device, or collection thereof, capable of enabling communications over the network 104 between the network device 106 and the source endpoint node 102, another network device 106, and/or the destination endpoint node 108. The communication circuitry 216 may be configured to use any one or more communication technology (e.g., wired or wireless communications) and associated protocols (e.g., Ethernet, Bluetooth®, Wi-Fi®, WiMAX, etc.) to effect such communication.

The illustrative communication circuitry 216 includes a network interface controller (NIC) 218, which may also be referred to as a host fabric interface (HFI). The NIC 218 may be embodied as one or more add-in-boards, daughtercards, network interface cards, controller chips, chipsets, or other devices that may be used by the network device 106 to connect the source endpoint node 102, the destination endpoint node 108, and/or another network device 106. In some embodiments, the NIC 218 may be embodied as part of a system-on-a-chip (SoC) that includes one or more processors, or included on a multichip package that also contains one or more processors. In some embodiments, the NIC 218 may include a local processor (not shown) and/or a local memory (not shown) that are both local to the NIC 218. In such embodiments, the local processor of the NIC 218 may be capable of performing one or more of the functions of the CPU 210 described herein. Additionally or alternatively, in such embodiments, the local memory of the NIC 218 may be integrated into one or more components of the network device 106 at the board level, socket level, chip level, and/or other levels.

The data storage device 220 may be embodied as any type of device or devices configured for short-term or long-term storage of data such as, for example, memory devices and circuits, memory cards, hard disk drives, solid-state drives, or other data storage devices. The data storage device 220 may include a system partition that stores data and firmware code for the network device 106. The data storage device 220 may also include an operating system partition that stores data files and executables for an operating system of the network device 106.

Additionally, the network device 106 may include one or more peripheral devices 224. Such peripheral devices 224 may include any type of peripheral device commonly found in a compute device such as speakers, a mouse, a keyboard, and/or other input/output devices, interface devices, and/or other peripheral devices. It should be appreciated that the network device 106 may include other components, subcomponents and/or devices commonly found in a network device, which are not illustrated in FIG. 2 for clarity of the description.

It should be appreciated that, in some embodiments, the network device 106 may be embodied as a core of a central processing unit (CPU) of a compute device that is capable of communicating between the source end point 102 and the destination end point 108. In such embodiments, the CPU of the compute device may include a batch size manager logic unit similar to the batch size manager logic unit 250, capable of performing the functions described above.

Figure 3:
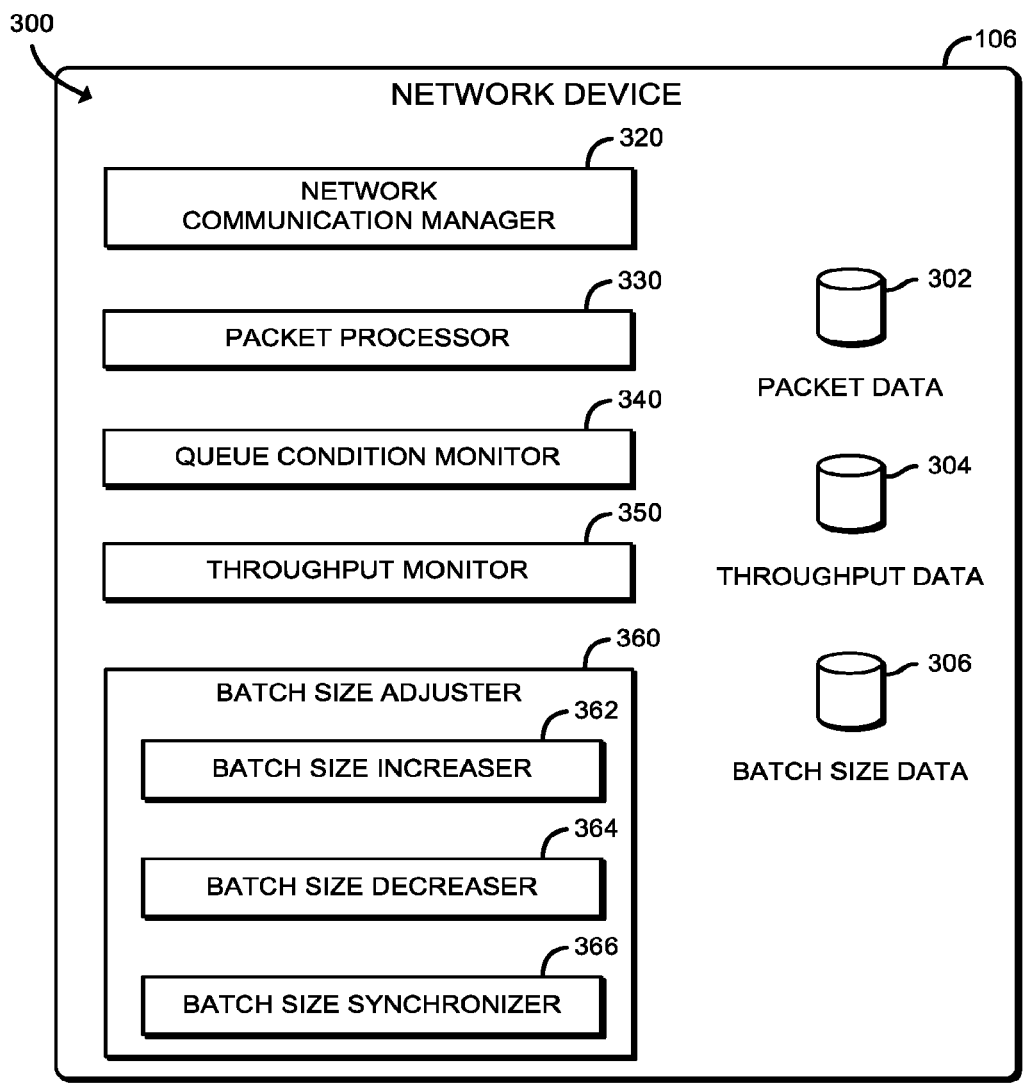
FIG. 3 is a simplified block diagram of at least one embodiment of an environment that may be established by the network device of FIGS. 1 and 2.

Referring now to FIG. 3, in the illustrative embodiment, each network device 106 may establish an environment 300 during operation. The illustrative environment 300 includes a network communication manager 320, a packet processor 330, a queue condition monitor 340, a throughput monitor 350, and a batch size adjuster 360, which includes a batch size increaser 362, a batch size decreaser 364, and a batch size synchronizer 366. Each of the components of the environment 300 may be embodied as hardware, firmware, software, or a combination thereof. As such, in some embodiments, one or more of the components of the environment 300 may be embodied as circuitry or collection of electrical devices (e.g., a network communication manager circuit 320, a packet processor circuit 330, a queue condition monitor circuit 340, a throughput monitor circuit 350, a batch size adjuster circuit 360, a batch size increaser circuit 362, a batch size decreaser circuit 364, a batch size synchronizer circuit 366, etc.). It should be appreciated that, in such embodiments, one or more of the network communication manager circuit 320, the packet processor circuit 330, the queue condition monitor circuit 340, the throughput monitor circuit 350, the batch size adjuster circuit 360, the batch size increaser circuit 362, the batch size decreaser circuit 364, or the batch size synchronizer circuit 366 may form a portion of one or more of the CPU 210, the main memory 212, the I/O subsystem 214, the communication circuitry 216 and/or other components of the network device 106. Additionally, in some embodiments, one or more of the illustrative components may form a portion of another component and/or one or more of the illustrative components may be independent of one another. Further, in some embodiments, one or more of the components of the environment 300 may be embodied as virtualized hardware components or emulated architecture, which may be established and maintained by the CPU 210 or other components of the network device 106.

The network communication manager 320, which may be embodied as hardware, firmware, software, virtualized hardware, emulated architecture, and/or a combination thereof as discussed above, is configured to facilitate inbound and outbound network communications (e.g., network traffic, network packets, network flows, etc.) to and from the network device 106, respectively. To do so, the network communication manager 320 is configured to receive and process data packets from one computing device (e.g., the source endpoint node 102, another network device 106, the destination endpoint node 108) and to prepare and send data packets to another computing device (e.g., the source endpoint node 102, another network device 106, the destination endpoint node 108). Accordingly, in some embodiments, at least a portion of the functionality of the network communication manager 320 may be performed by the communication circuitry 216, and, in the illustrative embodiment, by the NIC 218.

The packet processor 330, which may be embodied as hardware, firmware, software, virtualized hardware, emulated architecture, and/or a combination thereof as discussed above, is configured to process (e.g., perform operations on data in the packets, such as compression, decompression, encryption, decryption, and/or other operations) one or more packets in the queue. As described above, in the illustrative embodiment, the packets in the queue are processed in a batched fashion to maximize the throughput. The packet processor 330 may commence to process the packets when a threshold number of packets (i.e., a batch size of the processing stage) are present in the queue of the processing stage.

The queue condition monitor 340, which may be embodied as hardware, firmware, software, virtualized hardware, emulated architecture, and/or a combination thereof as discussed above, is configured to monitor the queue condition(s) of the processing stage(s). For example, the queue condition may include a number of packets present in the queue and an increasing or decreasing rate of change in the number of packets in the queue.

The throughput monitor 350, which may be embodied as hardware, firmware, software, virtualized hardware, emulated architecture, and/or a combination thereof as discussed above, is configured to monitor the throughput of each processing stage. As described above, the overall network throughput is a rate at which the packet data is being transmitted or delivered from the source endpoint node 102 to the destination endpoint node 108 over the network 104. When the packets are processed in multiple processing stages, the throughput of each processing stage is a rate at which the packet data is being processed and forwarded to a next processing stage. As such, the throughput of each processing stage may be monitored and adjusted to optimize the overall network throughput.

The batch size adjuster 360, which may be embodied as hardware, firmware, software, virtualized hardware, emulated architecture, and/or a combination thereof as discussed above, is configured to adjust a batch size for each processing stage based on the queue condition and the throughput of each processing stage. To do so, in the illustrative embodiment, the batch size adjuster 360 includes the batch size increaser 362, batch size decreaser 364, and the batch size synchronizer 366.

The batch size increaser 362, which may be embodied as hardware, firmware, software, virtualized hardware, emulated architecture, and/or a combination thereof as discussed above, is configured to increase the batch size for the processing stage to increase the throughput of the processing stage. In the illustrative embodiment, the batch size increaser 362 may multiplicatively increase the batch size for the processing stage using an additive decrease and multiplicative increase algorithm to quickly increase the batch size to avoid any packet loss due to packet congestion and to probe for an optimal batch size to decrease the latency performance while maintaining the throughput. If the batch size becomes too large, it negatively affects the latency performance by forcing the packets to wait in the queue while gathering enough packets to reach the batch size.

The batch size decreaser 364, which may be embodied as hardware, firmware, software, virtualized hardware, emulated architecture, and/or a combination thereof as discussed above, is configured to decrease the batch size for the processing stage to decrease the latency of the processing stage. In the illustrative embodiment, the batch size decreaser 364 may additively decrease the batch size for the processing stage using the additive decrease and multiplicative increase algorithm to decrease the batch size slowly to probe for an optimal batch size to decrease the latency performance while maintaining the throughput. In other words, the batch size is gradually decreased to reach a threshold where the throughput is maintained based on the queuing condition of the processing stage (e.g., the rate at which incoming packets are received). If the batch size is decreased below the threshold, the throughput will be negatively affected (e.g., decreased) and incoming packets may be dropped.

The batch size synchronizer 366, which may be embodied as hardware, firmware, software, virtualized hardware, emulated architecture, and/or a combination thereof as discussed above, is configured to synchronize the batch size across the multiple processing stages in the same processing pipeline. To do so, the batch size synchronizer 366 compares the present batch size for the present processing stage to batch size(s) for the other processing stage(s) to determine which batch size is greater. The batch size synchronizer 366 may synchronize the present batch size for the present processing stage if the present batch size is smaller than the batch size(s) for the other processing stage(s) to avoid any packet loss due to congestion. In such case, even if the synchronized batch size is larger than the optimal batch size for the processing stage, the larger synchronized batch size ensures that the packets are not dropped while being forwarded to the next processing stage. However, if the present batch size for the present processing stage is greater than the batch size(s) for the other processing stage(s), the batch size synchronizer 366 does not synchronize the present batch size for the present processing stage.

In the illustrative environment 300, the network device 106 also includes packet data 302, throughput data 304, and batch size data 306. The packet data 302 may be embodied as any data that is indicative of packet payloads, packet source and destination information, and packet metadata. The metadata defines properties of a packet, such as the packet size, an input port number, an output port number, and state data that is indicative of which processing stages have completed processing of the data packet and whether the data packet is ready for transmission to another device (e.g., to the destination endpoint node 108).

The throughput data 304 may be embodied as any data that is indicative of throughput for each processing stage. As discussed above, the throughput data 304 may be used to optimize the batch size of each processing stage across the multiple processing stages.

The batch size data 306 may be embodied as any data that is indicative of a batch size for a corresponding processing stage. As discussed above, each processing stage has its own batch size of packets, and the batch size for each processing stage may be different. In such case, the batching may be synchronized across the processing stage(s) to minimize the latency while achieving the maximum overall throughput of the network device 106.

Figure 4:
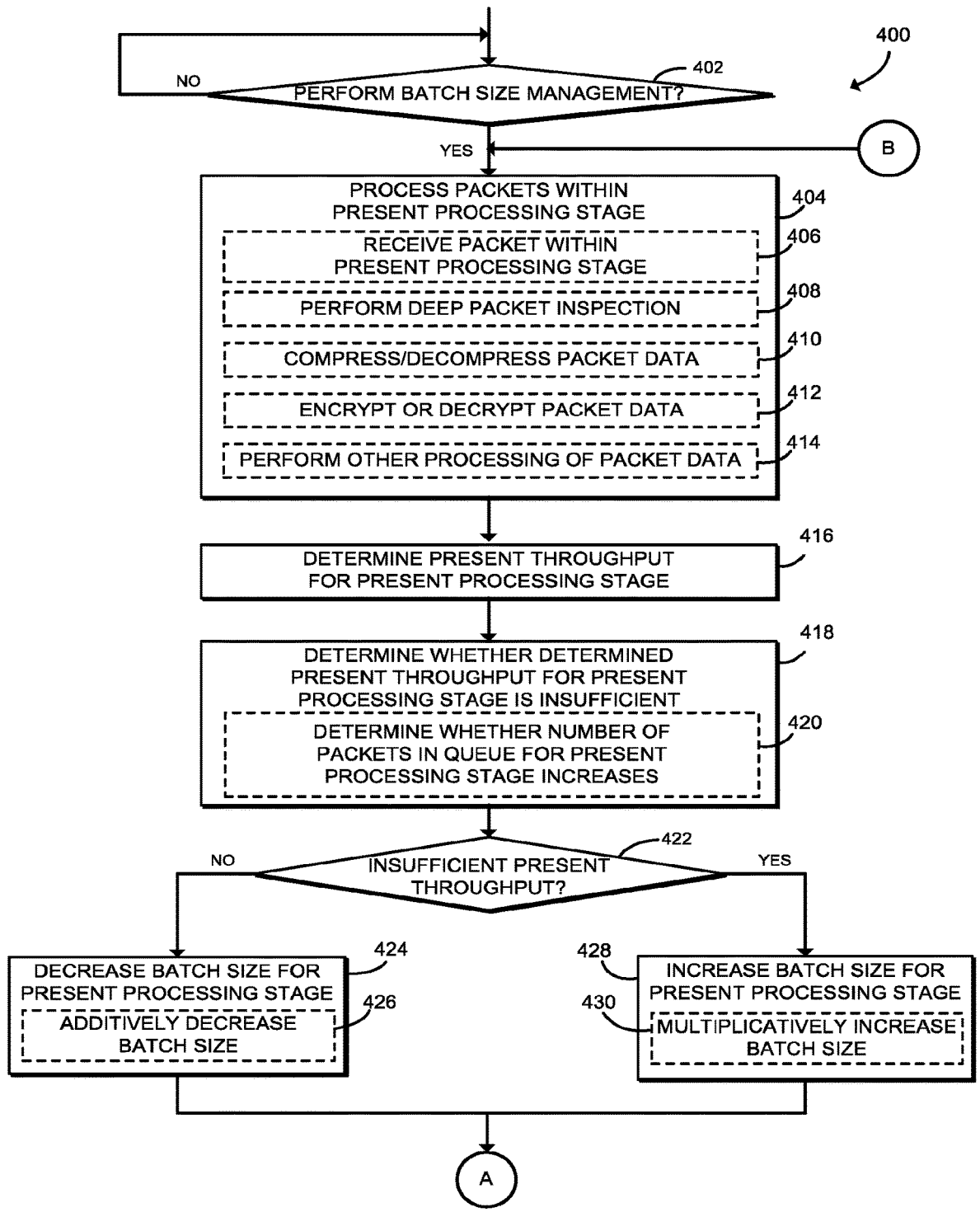
FIGS. 4-5 are a simplified flow diagram of at least one embodiment of a method for dynamically adjusting a batch size of packets to achieve an optimal combination of packet latency and throughput that may be executed by the network device of FIGS. 1-3.

Referring now to FIG. 4, in use, the network device 106 may execute a method 400 for dynamic batch size management for each processing stage. In the illustrative embodiment, the network device 106 continuously or periodically monitors the throughput and queuing condition for the present processing stage and determines an optimal batching configuration to minimize the latency performance while maintaining maximum throughput. It should be appreciated that the batching configuration may be adjusted based on throughputs and queuing conditions of multiple processing stages in the same processing pipeline to achieve the overall best performance. When one stage has egress interfaces with multiple queues for multiple processing stages, the network device 106 monitors each queue condition independently and makes the decision on the optimal configuration for each stage accordingly. Subsequently, the batch sizes of the processing stages are configured to be synchronized across the multiple processing stages.

The method 400 begins with block 402, in which the network device 106 determines whether to perform the batch size management. If the network device 106 determines not to perform the batch size management, the method 400 loops back to block 402 to continue determining whether to perform the batch size management. If, however, the network device 106 determines to perform the batch size management, the method 400 advances to block 404. In some embodiments, the network device 106 may determine to perform the batch size management in response to determining that the batch size manager logic unit 250 is present, in response to a determination that a setting stored in a configuration file in the data storage device 220 indicates to perform the batch size management, and/or as a function of other criteria.

In block 404, the network device 106 processes packets present in a queue of a present processing stage. As discussed above, in the illustrative embodiment, the network device 106 processes the packets over multiple processing stages. In some embodiments, however, only one processing stage may be used to process the incoming packets.

To do so, in some embodiments in block 406, the network device 106 may receive a packet within the present processing stage. In block 408, the network device 106 may perform a deep packet inspection of the received packet to inspect the packet data for candidate patterns and take actions based on the presence or absence of these patterns (e.g., searching for protocol non-compliance, viruses, spam, intrusions, or defined criteria to decide whether the packet may pass or if the packet should be routed to a different destination). In some embodiments, the network device 106 may compress or decompress the packet data and/or encrypt or decrypt the packet data, as indicated in blocks 410 and 412. It should be appreciated that the network device 106 may further perform other processing of the packet data in block 414.

In block 416, the network device 106 determines a present throughput for the present processing stage. As discussed above, the network throughput is a rate at which the packet data is being transmitted or delivered from the source endpoint node 102 to the destination endpoint node 108 over the network 104. When the packets are processed in multiple processing stages of the pipeline, the network throughput may be determined based on throughputs for each processing stages. In other words, the present throughput for the present processing stage is indicative of a rate at which the network device 106 is processing the packet data in the present processing stage.

In block 418, the network device 106 determines whether the determined present throughput for the present processing stage is insufficient. In other words, the network device 106 determines whether the present throughput satisfies a predefined condition. For example, as described above, the network device 106 may increase the batch size of packets to increase the throughput performance for the processing stage until the throughput performance no longer increases (i.e., the predefined condition), indicating that further increasing the batch size will only negatively affect the latency without increasing the throughput. As such, the network device 106 may determine whether the present throughput for the present processing stage has satisfied the predefined condition.

To do so, in some embodiments in block 420, the network device 106 determines whether a number of packets in a queue for the present processing stage is increasing to infer the throughput performance. For example, if the number of packets in the queue for the present processing stage continues to increase, it means that there are more packets coming in to the queue than packets being processed. As such, the increase in the number of packets in the queue indicates that the present throughput should be increased to maximize the throughput. On the other hand, if the number of packets in the queue starts to decrease, it means that there are more packets being processed than packets coming in to the queue. As such, the decrease in the number of packets in the queue indicates that the present batch size could be decreased to decrease the latency while maintaining the present throughput.

If the network device 106 determines that the present throughput for the present processing stage is not insufficient in block 422, the method 400 advances to block 424. For example, the network device 106 may determine that further increasing the batch size will only negatively affect the latency without increasing the throughput because the rate at which incoming packets are received in the queue has been reduced. In block 424, the network device 106 decreases the batch size for the present processing stage. To do so, in some embodiments in block 426, the network device 106 may additively decrease the batch size for the present processing stage using an additive decrease and multiplicative increase algorithm to decrease the batch size slowly to probe for an optimal batch size to decrease the latency performance while maintaining the throughput. In other words, the batch size is gradually decreased to reach a threshold where the throughput is maintained based on the queuing condition of the present processing stage (e.g., the rate at which incoming packets are received). If the batch size is decreased below the threshold, it will start to negatively affect the throughput. In addition, a batch size that is too small may cause incoming packets to be dropped. In response to decreasing the batch size of packets for the present processing stage, the method 400 advances to block 432 in FIG. 5 to synchronize the batch size across the multiple processing stages in the same processing pipeline.

Referring back to block 422, if the network device 106 determines that the present throughput for the present processing stage is insufficient, the method 400 advances to block 428. In block 428, the network device 106 increases the batch size for the present processing stage. To do so, in some embodiments in block 430, the network device 106 may multiplicatively increase the batch size for the present processing stage using an additive decrease and multiplicative increase algorithm to quickly increase the batch size to avoid any packet loss due to packet congestion and to probe for an optimal batch size to improve the latency performance (e.g., decrease the latency) while maintaining the throughput. However, if the batch size becomes too large, it negatively affects the latency performance by forcing the packets to wait in the queue while gathering enough packets to reach the batch size. In response to increasing the batch size of packets for the present processing stage, the method 400 advances to block 432 in FIG. 5 to synchronize the batch size across the multiple processing stages in the same processing pipeline.

In block 432, the network device 106 compares the batch size for the present processing stage to every batch size for preceding processing stage(s). In block 434, the network device 106 determines whether the batch size for the present processing stage is greater than the batch size for any one of the preceding processing stages. If the network device 106 determines that the batch size of the present processing stage is not greater than the batch size for any one of the preceding processing stages, network device 106 maintains the present batch size and the method 400 skips ahead to block 440 in which the network device 106 sets the present processing stage to the next stage (e.g., the network device 106 proceeds to the next processing stage for analysis).

The method 400 then loops back to block 404 to continuously or periodically monitor and adjust the optimal batch size for the present processing stage to minimize the latency while maintaining the throughput to achieve the overall best performance of the network device 106.

If, however, the network device 106 determines that the batch size of the present processing stage is greater than all the batch size(s) for the preceding processing stage(s), the method 400 advances to block 436. In block 436, the network device 106 synchronizes the batch size across the processing stage(s). To do so, in some embodiments in block 438, the network device 106 may set the batch size of the preceding processing stage(s) to the batch size for the present processing stage. This may allow the network device 106 to update an overall optimal batch size across the multiple processing stages to achieve the overall best performance of the network device 106.

The method 400 then advances to block 440 in which the network device 106 sets the present processing stage to the next stage and loops back to block 404 to continuously or periodically monitor and adjust the optimal batch size for the present processing stage to minimize the latency while maintaining the throughput. While the method 400 is described above as operating on each processing stage sequentially, in other embodiments, the network device 106 may operate on each processing stage concurrently (e.g., in separate threads) and share data (e.g., batch size information) across the threads.

Figure 6:
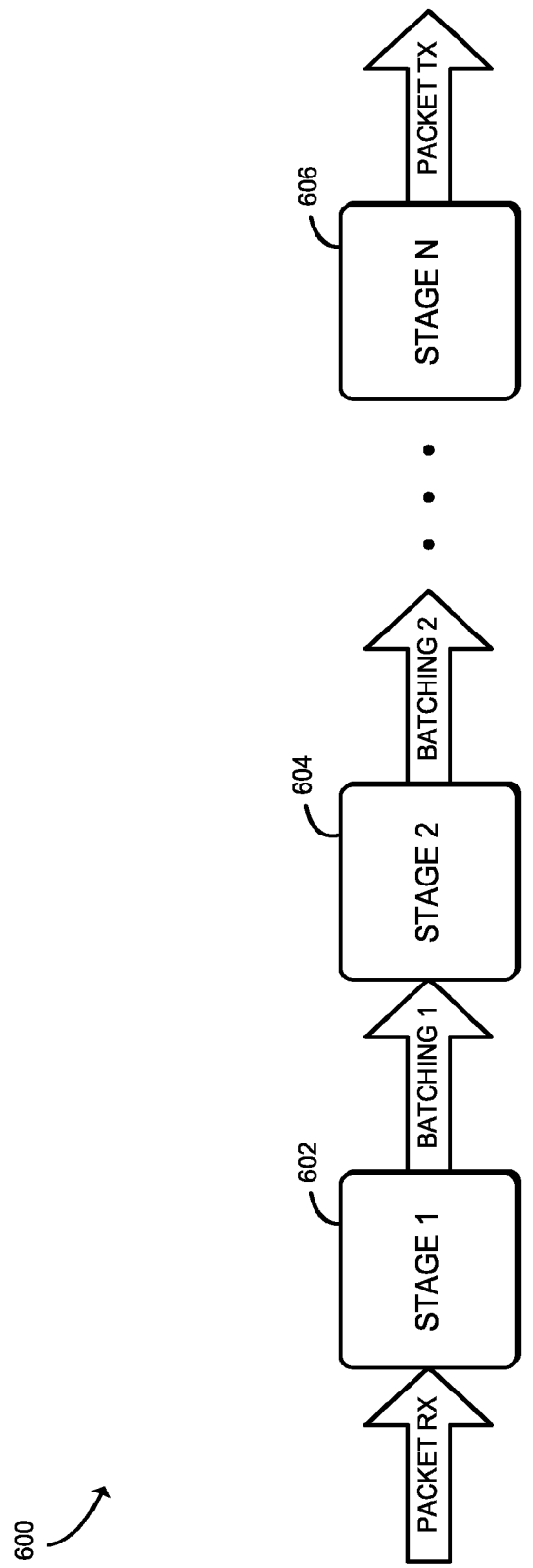
FIG. 6 is a simplified diagram of at least one embodiment of the network device of FIGS. 1-3 in which the network device coordinates batching configurations across multiple processing stages.

Referring now to FIG. 6, in an illustrative embodiment, the network device 106 is configured to coordinate batching configurations across the multiple processing stages in the same processing pipeline. As shown in FIG. 6, there are n processing stages that process incoming packets. The incoming packets are received in a stage 1 602 from a source endpoint node 102. The packets wait in a queue of the stage 1 602 while gathering enough packets to form a batch of predefined batch size for the stage 1 602. As discussed in detail above, the network device 106 determines an optimal batching configuration for the stage 1 602 to minimize the latency while maintaining throughput for the stage 1 602. When enough packets are gathered in the queue of the stage 1 602 to satisfy the optimal batching configuration for the stage 1 602, the batch of packets (i.e., batching 1) is forwarded to a stage 2 604.

Similarly, the stage 2 604 has its own queue, batch size, and throughput. The network device 106 determines an optimal batching configuration for the stage 2 604 to minimize the latency while maintaining the same throughput for the stage 2 604. In some embodiments, when enough packets are gathered in the queue of the stage 2 604 to satisfy the optimal batching configuration for the stage 2 604, the batch of packets (i.e., batching 2) is forwarded to a next processing stage.

However, in the illustrative embodiment, the network device 106 may further synchronize the batch size for the stage 1 602 and the stage 2 604. It should be appreciated that the network device 106 may only synchronize the batch size for the stage 2 604 if the batch size for the stage 2 604 is greater than the batch size for the stage 1 602. If the batch size for the stage 2 604 is greater than the batch size for the stage 1 602, the network device 106 updates the overall optimal batch size across the multiple processing stages to the batch size for the stage 2 604. As discussed above, even if the synchronized batch size is larger than the optimal batch size for the stage 1 602, the larger batch size ensures that the packets are not dropped while being forwarded to the next processing stage. If, however, the batch size for the stage 2 604 is smaller than the batch size for the stage 1 602, the network device 106 does not synchronize the batch size. When enough packets are gathered in the queue of the stage 2 604 to satisfy the synchronized batch size for the stage 2 604, the batch of packets (i.e., batching 2) is forwarded to a next processing stage. The forwarding step is repeated until the packets reach a stage N 606 to be processed for the last time before transmitted to a destination endpoint node 108.

In some embodiments, each stage may distribute its batch of packets to multiple egress queues, where each egress queue may be processed by a core. Each queue may correspond to a core for the next stage processing. For each core, a new pipeline batch size may be determined for each stage, and synchronization of batch sizes may be performed between the stages for each core in a similar manner as described above. For example, at stage 1, a new pipeline batch size may be determined for core 1 for stage 1. When the packets are forwarded to stage 2, core 1 may determine a new pipeline batch size for stage 2. The network device 106 may then synchronize the batch size for the stage 1 and the stage 2 for core 1 in the similar manner as described above such that the batch sizes of each core are synchronized.

EXAMPLES

Illustrative examples of the technologies disclosed herein are provided below. An embodiment of the technologies may include any one or more, and any combination of, the examples described below.

Example 1 includes a network device comprising a network interface controller; and one or more processors coupled to the network interface controller, wherein the one or more processors are to receive, into a queue, packets from a remote node to be processed by the network device, received via the network interface controller; determine a throughput provided by the network device while the packets are processed; determine whether the determined throughput satisfies a predefined condition; and adjust a batch size of packets in response to a determination that the determined throughput satisfies a predefined condition; wherein the batch size is indicative of a threshold number of queued packets required to be present in the queue before the queued packets in the queue can be processed by the network device.

Example 2 includes the subject matter of Example 1, and wherein to determine whether the determined throughput satisfies a predefined condition comprises to determine whether the number of packets in the queue has increased over time.

Example 3 includes the subject matter of any of Examples 1 and 2, and wherein to adjust the batch size comprises to increase the batch size.

Example 4 includes the subject matter of any of Examples 1-3, and wherein to increase the batch size comprises to multiplicatively increase the batch size for a processing stage of the network device.

Example 5 includes the subject matter of any of Examples 1-4, and wherein the one or more processors are further to adjust the batch size in response to a determination that the determined throughput does not satisfy the predefined condition.

Example 6 includes the subject matter of any of Examples 1-5, and wherein to adjust the batch size comprises to decrease the batch size for a processing stage of the network device.

Example 7 includes the subject matter of any of Examples 1-6, and wherein to adjust the batch size comprises to additively decrease the batch size for a processing stage of the network device.

Example 8 includes the subject matter of any of Examples 1-7, and wherein the one or more processors are further to process one or more packets with multiple processing stages, wherein each processing stage performs a different operation on packet data.

Example 9 includes the subject matter of any of Examples 1-8, and wherein the one or more processors are further to synchronize the adjusted batch size across multiple processing stages of the network device.

Example 10 includes the subject matter of any of Examples 1-9, and wherein to synchronize the adjusted batch size comprises to compare the batch size of a present processing stage with the batch size for every preceding processing stage in the network device; and adjust, in response to a determination that the batch size of the present processing stage is greater than the batch size for every preceding processing stage, the batch size for every preceding processing stage to the batch size of the present processing stage.

Example 11 includes the subject matter of any of Examples 1-10, and wherein the one or more processors are further to compare the batch size of a present processing stage with a batch size for a preceding processing stage; and maintain, in response to a determination that the batch size of the present processing stage is smaller than the batch size for the preceding processing stage, the batch size of the preceding processing stage.

Example 12 includes a method for dynamically managing a batch size of packets, the method comprising receiving, by a network device and into a queue, packets from a remote node to be processed by the network device, received via a network interface controller of the network device; determining, by the network device, a throughput provided by the network device while processing the packets; determining, by the network device, whether the determined throughput satisfies a predefined condition; and adjusting, by the network device, a batch size of packets in response to a determination that the determined throughput satisfies a predefined condition; wherein the batch size is indicative of a threshold number of queued packets required to be present in the queue before the queued packets in the queue can be processed by the network device.

Example 13 includes the subject matter of Example 12, and wherein determining whether the determined throughput satisfies a predefined condition comprises determining whether the number of packets in the queue has increased over time.

Example 14 includes the subject matter of any of Examples 12 and 13, and wherein adjusting the batch size comprises increasing the batch size.

Example 15 includes the subject matter of any of Examples 12-14, and wherein increasing the batch size comprises multiplicatively increasing the batch size for a processing stage of the network device.

Example 16 includes the subject matter of any of Examples 12-15, and further including adjusting, by the network device, the batch size in response to a determination that the determined throughput does not satisfy the predefined condition.

Example 17 includes the subject matter of any of Examples 12-16, and wherein adjusting the batch size comprises decreasing the batch size for a processing stage of the network device.

Example 18 includes the subject matter of any of Examples 12-17, and wherein adjusting the batch size comprises additively decreasing the batch size for a processing stage of the network device.

Example 19 includes the subject matter of any of Examples 12-18, and further including processing, by the network device, one or more packets with multiple processing stages, wherein each processing stage performs a different operation on packet data.

Example 20 includes the subject matter of any of Examples 12-19, and further including synchronizing, by the network device, the adjusted batch size across multiple processing stages of the network device.

Example 21 includes the subject matter of any of Examples 12-20, and wherein synchronizing the adjusted batch size comprises comparing, by the network device, the batch size of a present processing stage with the batch size for every preceding processing stage in the network device; and adjusting, by the network device and in response to a determination that the batch size of the present processing stage is greater than the batch size for every preceding processing stage, the batch size for every preceding processing stage to the batch size of the present processing stage.

Example 22 includes the subject matter of any of Examples 12-21, and further including comparing, by the network device, the batch size of a present processing stage with a batch size for a preceding processing stage; and maintaining, by the network device in response to a determination that the batch size of the present processing stage is smaller than the batch size for the preceding processing stage, the batch size of the preceding processing stage.

Example 23 includes one or more machine-readable storage media comprising a plurality of instructions stored thereon that, in response to being executed, cause a network device to perform the method of any of Examples 12-22.

Example 24 includes a network device comprising one or more processors; one or more memory devices having stored therein a plurality of instructions that, when executed by the one or more processors, cause the compute device to perform the method of any of Examples 12-22.

Example 25 includes a network device comprising means for performing the method of any of Examples 12-22.

Example 26 includes a network device comprising a network interface controller; and batch size adjuster circuitry to receive, into a queue, packets from a remote node to be processed by the network device, received via the network interface controller; determine a throughput provided by the network device while the packets are processed; determine whether the determined throughput satisfies a predefined condition; and adjust a batch size of packets in response to a determination that the determined throughput satisfies a predefined condition; wherein the batch size is indicative of a threshold number of queued packets required to be present in the queue before the queued packets in the queue can be processed by the network device.

Example 27 includes the subject matter of Example 26, and wherein to determine whether the determined throughput satisfies a predefined condition comprises to determine whether the number of packets in the queue has increased over time.

Example 28 includes the subject matter of any of Examples 26 and 27, and wherein to adjust the batch size comprises to increase the batch size.

Example 29 includes the subject matter of any of Examples 26-28, and wherein to increase the batch size comprises to multiplicatively increase the batch size for a processing stage of the network device.

Example 30 includes the subject matter of any of Examples 26-29, and wherein the batch size adjuster circuitry is further to adjust the batch size in response to a determination that the determined throughput does not satisfy the predefined condition.

Example 31 includes the subject matter of any of Examples 26-30, and wherein to adjust the batch size comprises to decrease the batch size for a processing stage of the network device.

Example 32 includes the subject matter of any of Examples 26-31, and wherein to adjust the batch size comprises to additively decrease the batch size for a processing stage of the network device.

Example 33 includes the subject matter of any of Examples 26-32, and further including packet processor circuitry to process one or more packets with multiple processing stages, wherein each processing stage performs a different operation on packet data.

Example 34 includes the subject matter of any of Examples 26-33, and wherein the batch size adjuster circuitry is further to synchronize the adjusted batch size across multiple processing stages of the network device.

Example 35 includes the subject matter of any of Examples 26-34, and wherein to synchronize the adjusted batch size comprises to compare the batch size of a present processing stage with the batch size for every preceding processing stage in the network device; and adjust, in response to a determination that the batch size of the present processing stage is greater than the batch size for every preceding processing stage, the batch size for every preceding processing stage to the batch size of the present processing stage.

Example 36 includes the subject matter of any of Examples 26-35, and wherein the batch size adjuster circuitry is further to compare the batch size of a present processing stage with a batch size for a preceding processing stage; and maintain, in response to a determination that the batch size of the present processing stage is smaller than the batch size for the preceding processing stage, the batch size of the preceding processing stage.

Example 37 includes a network device comprising circuitry for receiving, into a queue, packets from a remote node to be processed by the network device, received via a network interface controller of the network device; circuitry for determining a throughput provided by the network device while processing the packets; circuitry for determining whether the determined throughput satisfies a predefined condition; and means for adjusting a batch size of packets in response to a determination that the determined throughput satisfies a predefined condition; wherein the batch size is indicative of a threshold number of queued packets required to be present in the queue before the queued packets in the queue can be processed by the network device.

Example 38 includes the subject matter of Example 37, and wherein circuitry for determining whether the determined throughput satisfies a predefined condition comprises circuitry for determining whether the number of packets in the queue has increased over time.

Example 39 includes the subject matter of any of Examples 37 and 38, and wherein the means for adjusting the batch size comprises means for increasing the batch size.

Example 40 includes the subject matter of any of Examples 37-39, and wherein the means for increasing the batch size comprises means for multiplicatively increasing the batch size for a processing stage of the network device.

Example 41 includes the subject matter of any of Examples 37-40, and further including means for adjusting the batch size in response to a determination that the determined throughput does not satisfy the predefined condition.

Example 42 includes the subject matter of any of Examples 37-41, and wherein the means for adjusting the batch size comprises means for decreasing the batch size for a processing stage of the network device.

Example 43 includes the subject matter of any of Examples 37-42, and wherein the means for adjusting the batch size comprises means for additively decreasing the batch size for a processing stage of the network device.

Example 44 includes the subject matter of any of Examples 37-43, and further including circuitry for processing one or more packets with multiple processing stages, wherein each processing stage performs a different operation on packet data.

Example 45 includes the subject matter of any of Examples 37-44, and further including means for synchronizing the adjusted batch size across multiple processing stages of the network device.

Example 46 includes the subject matter of any of Examples 37-45, and wherein the means for synchronizing the adjusted batch size comprises means for comparing the batch size of a present processing stage with the batch size for every preceding processing stage in the network device; and means for adjusting, in response to a determination that the batch size of the present processing stage is greater than the batch size for every preceding processing stage, the batch size for every preceding processing stage to the batch size of the present processing stage.

Example 47 includes the subject matter of any of Examples 37-46, and further including means for comparing the batch size of a present processing stage with a batch size for a preceding processing stage; and means for maintaining, in response to a determination that the batch size of the present processing stage is smaller than the batch size for the preceding processing stage, the batch size of the preceding processing stage.

What is claimed is:

1. Server system to queue data to be received via at least one network, the server system comprising:
    circuitry to be configured to perform operations comprising:
        queuing received data;
        dynamically determining, based upon at least one queue wait time, a batch size to be used in association with the received data;
        after the batch size of the received data has been queued, generating a batch of queued data in accordance with the batch size; and
        performing at least one processing on the batch of queued data;
    wherein:
        the batch size is indicative of a queued data threshold that is to be present before the at least one processing is to be performed;
        the dynamically determining is to be implemented, at least in part, using central processing unit circuitry and graphics processing unit circuitry in a virtualized packet processing environment that is configurable to be used in association with software-defined networking and/or network function virtualization; and
        the dynamically determining is configurable to synchronize the batch size across multiple processing stages that are to implement, at least in part, the at least one processing.

2. The server system of claim 1, wherein the operations further comprise:
    dynamically determining whether to adjust the batch size for use in association with additional queued data.

3. The server system of claim 1, wherein:
    the batch size is to be determined based upon one or more configuration settings associated with one or more configurable criteria.

4. The server system of claim 3, wherein:
    the one or more configurable criteria are configurable to comprise:

at least one processing latency associated with the received data; and/or at least one queuing condition associated with the received data.

5. The server system of claim 1, wherein:

the server system is configurable for use in determining processing throughput associated with the received data; and the processing throughput is usable in association with batch size adjustment determination.

6. The server system of claim 1, wherein:

the server system is configurable to implement the multiple processing stages.

7. At least one non-transitory machine-readable storage medium storing instructions for being executed by circuitry of a server system, the server system to queue data to be received via at least one network, the instructions, when executed by the circuitry, resulting in the circuitry being configured for performance of operations comprising:

queuing received data;

dynamically determining, based upon at least one queue wait time, a batch size to be used in association with the received data;

after the batch size of the received data has been queued, generating a batch of queued data in accordance with the batch size; and performing at least one processing on the batch of queued data;

wherein:

the batch size is indicative of a queued data threshold that is to be present before the at least one processing is to be performed;

the dynamically determining is to be implemented, at least in part, using central processing unit circuitry and graphics processing unit circuitry in a virtualized packet processing environment that is configurable to be used in association with software-defined networking and/or network function virtualization; and the dynamically determining is configurable to synchronize the batch size across multiple processing stages that are to implement, at least in part, the at least one processing.

8. The at least one non-transitory machine-readable storage medium of claim 7, wherein the operations further comprise:

dynamically determining whether to adjust the batch size for use in association with additional queued data.

9. The at least one non-transitory machine-readable storage medium of claim 7, wherein:

the batch size is to be determined based upon one or more configuration settings associated with one or more configurable criteria.

10. The at least one non-transitory machine-readable storage medium of claim 9, wherein:

the one or more configurable criteria are configurable to comprise:

at least one processing latency associated with the received data; and/or at least one queuing condition associated with the received data.

11. The at least one non-transitory machine-readable storage medium of claim 7, wherein:

the server system is configurable for use in determining processing throughput associated with the received data; and the processing throughput is usable in association with batch size adjustment determination.

12. The at least one non-transitory machine-readable storage medium of claim 7, wherein:

the server system is configurable to implement the multiple processing stages.

13. A method implemented using a server system, the server system to queue data to be received via at least one network, the method comprising:

queuing received data;

dynamically determining, based upon at least one queue wait time, a batch size to be used in association with the received data;

after the batch size of the received data has been queued, generating a batch of queued data in accordance with the batch size; and performing at least one processing on the batch of queued data;

wherein:

the batch size is indicative of a queued data threshold that is to be present before the at least one processing is to be performed;

the dynamically determining is to be implemented, at least in part, using central processing unit circuitry and graphics processing unit circuitry in a virtualized packet processing environment that is configurable to be used in association with software-defined networking and/or network function virtualization; and the dynamically determining is configurable to synchronize the batch size across multiple processing stages that are to implement, at least in part, the at least one processing.

14. The method of claim 13, wherein the operations further comprise:

dynamically determining whether to adjust the batch size for use in association with additional queued data.

15. The method of claim 13, wherein:

the batch size is to be determined based upon one or more configuration settings associated with one or more configurable criteria.

16. The method of claim 15, wherein:

the one or more configurable criteria are configurable to comprise:

at least one processing latency associated with the received data; and/or at least one queuing condition associated with the received data.

17. The method of claim 13, wherein:

the server system is configurable for use in determining processing throughput associated with the received data; and the processing throughput is usable in association with batch size adjustment determination.

18. The method of claim 13, wherein:

the server system is configurable to implement the multiple processing stages.

19. A distributed computing system to be used in association with at least one network, the distributed computing system comprising:

at least one network device; and a server system communicatively coupled via the at least one network to the at least one network device, the server system to queue data to be received from the at least one network device via the at least one network, the server system comprising circuitry to be configured to perform operations comprising:

dynamically determining, based upon at least one queue wait time, a batch size to be used in association with the received data;

after the batch size of the received data has been queued, generating a batch of queued data in accordance with the batch size; and performing at least one processing on the batch of queued data;

wherein:

the batch size is indicative of a queued data threshold that is to be present before the at least one processing is to be performed;

the dynamically determining is to be implemented, at least in part, using central processing unit circuitry and graphics processing unit circuitry in a virtualized packet processing environment that is configurable to be used in association with software-defined networking and/or network function virtualization; and the dynamically determining is configurable to synchronize the batch size across multiple processing stages that are to implement, at least in part, the at least one processing.

20. The distributed computing system of claim 19, wherein the operations further comprise:

dynamically determining whether to adjust the batch size for use in association with additional queued data.

21. The distributed computing system of claim 19, wherein:

the batch size is to be determined based upon one or more configuration settings associated with one or more configurable criteria.

22. The distributed computing system of claim 21, wherein:

the one or more configurable criteria are configurable to comprise:

at least one processing latency associated with the received data; and/or at least one queuing condition associated with the received data.

23. The distributed computing system of claim 19, wherein:

the server system is configurable for use in determining processing throughput associated with the received data; and the processing throughput is usable in association with batch size adjustment determination.

24. The distributed computing system of claim 19, wherein:

the server system is configurable to implement the multiple processing stages.

* * * * *